Patented Apr. 26, 1938

2,115,648

UNITED STATES PATENT OFFICE 2,115,648

PROCESS FOR THE MANUFACTURE OF SPUN GOODS, FABRICS, AND OTHER TEXTILES

Roland Runkel, Weinheim, Germany, assignor to the firm Carl Freudenberg G. m. b. H., Weinheim, Germany, a corporation of Germany No Drawing. Application July 13, 1935, Serial No. 31,284. In Germany July 23, 1934

11 Claims. (Cl. 19—2)

This invention relates to a process for the manufacture of spun goods, fabrics and other textiles.

In a joint application by the inventor (Serial No. 751.112) there is described a process for the manufacture of spun goods, fabrics and other textiles, employing or co-employing fibres obtained from animal skins, which is characterized by the employment of fibres, which have been obtained by effecting coarse shredding of animal skins pretreated with swelling agents, treating the coarse fibrous material with agents which change the colloidal properties of the fibres and in particular prevent the fibrous material from gumming up and becoming horny on removal of water, for example with the aid of organic liquids miscible with water, and finely shredding the material so treated.

In a further copending application of R. Freudenberg (Serial No. 19.751 which has been assigned to the owner of the present application), modifications of the above process are described which comprise employing tanning agents, pseudo-tanning agents or substances having a tanning action or solutions of the same, instead of, or in addition to, organic liquids miscible with water, the coarse fibrous material being preferably treated, before the treatment with tanning agents or the like, with substances, such as water, alkalis, alkaline earths or acids, which have a dissolving action on the substances which cause the fibrous material to gum up or become horny and may, if desired, also exert a swelling action on the fibrous material.

According to the present invention the fibrous material is produced in such a way that the fibres or fibre bundles liberated during the process of shredding the skins are disposed parallel or substantially parallel and the material is subjected in this condition to further treatment, for example with organic solvents or other liquids or solutions, which alter the colloidal properties of the fibrous material and in particular prevent the fibrous material from gumming up and becoming horny.

The skins and skin parts under treatment can be prepared in the same manner as in the processes of the aforesaid previous applications, for example by converting the skins by treatment with swelling chemicals into a condition, which enables mechanical disintegration to be effected without damage to the fibres, with liberation of the latter or of the more or less loosened fibre ropes or fibre bundles. The skins softened, for example by treatment with swelling chemicals, can be further worked up in accordance with this invention, for example by subjecting the same to a disintegrating or shredding operation under conditions, under which the fibres or fibre ropes are liberated without becoming twisted or knotted or without sticking together and the like. The resulting coarse fibrous material may be treated by the following procedures which have been disclosed in the aforementioned applications Serial Nos. 751,112 and 19,751. It may be treated directly, or after previous pickling, with tanning agents or pseudo tanning agents as for example, aqueous solutions of these substances. An alternative procedure, however, is to treat the coarse fibrous material first with substances such as water, alkalies, alkaline earths or acids. This treatment may be replaced by a treatment with organic liquids miscible with water which alter the colloidal properties of the fibrous material with or without a following drying treatment. A further alternative procedure is to treat the fibrous material both with substances such as water, alkalies and the like and also with organic liquids miscible with water. These treatments are then followed by hardening and stabilizing of the fibres with tanning agents and the like. The coarse fibrous material may also be simultaneously treated with organic liquids and solutions of tanning agents, for example, by being further worked up in alcohol containing solutions of tanning agents.

The process of this invention may, for example, be carried into effect by disintegrating the softened skins in a wet condition with the aid of apparatus, such as combs, forks, scrapers and the like, in such a way that the fibres and fibre ropes liberated by the teeth of the combs and the like are laid on suitable bases without becoming twisted and the like and are subjected on the same to further treatment, for example with swelling agents, washing agents, e. g. water, or aqueous solutions and dehydrating agents, such as alcohol, acetone and the like.

As base for the reception of the fibres and fibre bundles a perforated conveyor belt may, for example, be employed. The desired parallel arrangement of the fibres and fibre bundles can be thereby effected in a simple manner by the tension of the disintegrating device and the movement of the belt.

Another embodiment of this invention consists in mechanically shredding the skin parts, which have been rendered capable of being disintegrated by a swelling treatment, with the aid of Hollander grinding rollers, e. g. of stone material, which are disposed in series in a channel, which may if desired be slightly inclined, and conveying the liberated fibres and fibre ropes through a vigorously flowing current of water and applying them to a suitable base, for example a perforated conveyor belt on which they can then be subjected to further treatment.

After the fibrous material has been freed from water to the desired extent by treatment with substances which prevent gumming up and has, if desired, been dried, it may be conveyed over carding combs or similarly acting devices. In this way it is possible in a very simple manner to divide the fibre ropes into fibre bundles and again to divide the latter into individual fibres and fibrils.

The process of this invention enables fibres, having particularly valuable textile properties, e. g. with regard to length of staple, fineness of fibre, avoidance of formation of burls, split ends and the like, to be obtained.

*Examples*

1. 1000 kgms. of neat's skin splits are laid for 30 days in milk of lime, thereafter washed, treated with dilute hydrochloric acid and again laid for 30 days in lime. The material is thereafter passed through a disintegrating device, in which it is first loosened up between porcupine rollers, then gripped by so-called carding belts and finally combed out and laid on conveyor belts. The parallel disposed fibrous product is then passed over washing devices, in which it is wetted, for example with the aid of atomizing nozzles, and simultaneously freed from water with the aid of suction rollers. This process is, if necessary, repeated. A hydrochloric acid pickle is then uniformly incorporated with the fibre fleece with the aid of an atomizer assisted by an aspirator and finally a tanning solution, e. g. a chrome broth, is added in the same manner as the aforementioned liquids. The product is stored in a reservoir and, after complete tanning has taken place, is washed, slightly lubricated with an oil emulsion, dried, passed over a saturator and finally finely shredding the fibrous material with carding combs or similarly acting devices. A textile material resembling wool is obtained.

2. 1000 kgms. of calf skin waste are laid for 100 days in milk of lime and then passed, if desired repeatedly passed, in a channel with flowing liquid through grinding devices of the Hollander roller type, for example with stone grinders, conveyed from the channel onto a perforated conveyor belt and further worked up thereon as described in Example 1.

What I claim is:

1. In a process for the manufacture of spun goods, fabrics and other textiles by treating animal skins with swelling agents, effecting coarse mechanical shredding of skins while still in swollen condition, treating the fibrous material with agents which alter the colloidal properties of the fibers and prevent the fibrous material from gumming up and becoming horny on the removal of water, and finely shredding materials so treated, the improvement which comprises carrying out the coarse shredding operation with Hollander grinding rollers while preventing entangling, twisting and knotting of the liberated skin fibres and fibre bundles.

2. A process according to claim 1, wherein the coarse mechanical shredding of the animal skins is carried out under water.

3. A process according to claim 1, wherein the coarse mechanical shredding of the animal skins is carried out under aqueous liquids.

4. A process according to claim 1, wherein the fibers and fiber bundles liberated by the coarse shredding treatment are conveyed and disposed parallelly by flowing liquids.

5. A process according to claim 1, wherein the fibers and fiber bundles liberated by the coarse shredding treatment are conveyed by flowing liquids, laid upon conveyor belts in parallel disposition by said liquids and subjected to further treatment with at least one fluid on said conveyor belts.

6. In a process for the manufacture of spun goods, fabrics and other textiles by treating animal skins with swelling agents, effecting coarse mechanical shredding of skins while still in swollen condition, treating the fibrous material with agents which alter the colloidal properties of the fibers and prevent the fibrous material from gumming up and becoming horny on the removal of water, and finely shredding materials so treated, the improvement which comprises the disintegration of the swollen skins with apparatus provided with shredding teeth while preventing entangling, twisting and knotting of the liberated skin fibres and fibre bundles and orienting said fibres and fibre bundles parallelly.

7. A process for the manufacture of spun goods, fabrics and other textiles, which comprises, treatment of animal skins with swelling agents, coarse mechanical shredding of the skins while they are still in swollen condition under conditions under which the skin fibers are liberated and disposed parallelly and prevented from becoming entangled, twisted and knotted, laying the liberated and parallelly disposed fibers upon conveyor belts, treating the fibrous material on said belts with agents which alter the colloidal properties of the fibers and prevent the fibrous material from gumming up and becoming horny on the removal of water, finely shredding the material so treated and further working up of the material to spun goods, fabrics and other textiles.

8. A process according to claim 1 wherein the fibres and fibre bundles which have been liberated while preventing entangling, twisting and knotting thereof are laid on conveyor belts and are subjected to further treatment with at least one fluid while on said conveyor belts.

9. A process according to claim 6 wherein the parallelly oriented fibres and fibre bundles which have been liberated are subjected to further treatment with at least one fluid while maintaining said fibres and fibre bundles in parallel disposition.

10. A process according to claim 6 wherein the parallelly orientated fibres which have been liberated are laid on conveyor belts under parallel disposition and are subjected to further treatment with at least one fluid on said conveyor belts while maintaining said fibres and fibre bundles in parallel disposition.

11. A process according to claim 6 wherein the parallelly orientated fibres which have been liberated are laid on perforated conveyor belts under parallel disposition and are subjected to further treatment with at least one fluid on said perforated conveyor belts while maintaining said fibres and fibre bundles in parallel disposition.

ROLAND RUNKEL.